US007660293B2

(12) United States Patent  
Itagaki et al.

(10) Patent No.: US 7,660,293 B2  
(45) Date of Patent: Feb. 9, 2010

(54) NETWORK, PRIVATE BRANCH EXCHANGE, AND MULTI PROTOCOL COMMUNICATION TERMINAL CONTROL METHOD FOR USE IN THE EXCHANGE

(75) Inventors: Yoshio Itagaki, Tokyo (JP); Shinobu Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 843 days.

(21) Appl. No.: 10/968,185

(22) Filed: Oct. 20, 2004

(65) Prior Publication Data

US 2005/0083916 A1 Apr. 21, 2005

(30) Foreign Application Priority Data

Oct. 21, 2003 (JP) ............................. 2003-360133

(51) Int. Cl.  
*H04L 12/66* (2006.01)

(52) U.S. Cl. ................. 370/352; 370/230; 370/260; 370/299; 370/385; 370/401

(58) Field of Classification Search ............. 370/300, 370/401, 467, 230, 260, 271, 299, 385, 386, 370/410, 352  
See application file for complete search history.

(56) References Cited

U.S. PATENT DOCUMENTS

| 6,738,390 | B1 | 5/2004 | Xu et al. | |
|---|---|---|---|---|
| 6,795,430 | B1 * | 9/2004 | Ong et al. | ................... 370/352 |
| 6,819,665 | B1 * | 11/2004 | Pinard et al. | ................ 370/352 |
| 6,993,360 | B2 * | 1/2006 | Plahte et al. | ................ 455/555 |
| 7,002,989 | B2 * | 2/2006 | Agrawal et al. | ............. 370/467 |
| 7,123,707 | B1 * | 10/2006 | Hiri et al. | .............. 379/215.01 |
| 7,145,900 | B2 * | 12/2006 | Nix et al. | ..................... 370/352 |
| 7,180,984 | B1 * | 2/2007 | Samarasinghe | .......... 379/88.13 |

(Continued)

FOREIGN PATENT DOCUMENTS

EP 1 311 103 A3 5/2003

(Continued)

OTHER PUBLICATIONS

"(b2bua) Anyone using B2BUA for pbx applications?", http://www.vovlda.ort/pipermail/b2bua/2003-February/000116.html Mar. 17, 2005.

(Continued)

*Primary Examiner*—Ricky Ngo  
*Assistant Examiner*—Dewanda Samuel  
(74) *Attorney, Agent, or Firm*—Foley & Lardner LLP

(57) ABSTRACT

There is disclosed a private branch exchange in which an SIP terminal is capable of receiving great variety of services provided by the private branch exchange without upgrading version of software of the SIP terminal itself. A standard SIP protocol control module 16, an expanded SIP protocol a control module 17, and an expanded SIP protocol b control module 18 are disposed for SIP system protocol corresponding terminals, convert signals (requests) from the SIP system protocol corresponding terminals into signals of a protocol inside an IP-PBX 1 to transmit the signals to a PBX basic connection process providing module 12, and convert a signal (responses to the request, or a request to the SIP system protocol corresponding terminal) from the PBX basic connection process providing module 12 into a signal of an SIP system protocol to transmit the signal to the SIP system protocol corresponding terminal.

21 Claims, 9 Drawing Sheets

U.S. PATENT DOCUMENTS

| | | | |
|---|---|---|---|
| 7,266,591 B1 * | 9/2007 | Johnston | 709/219 |
| 7,280,530 B2 * | 10/2007 | Chang et al. | 370/352 |
| 7,391,762 B2 * | 6/2008 | Ko | 370/352 |
| 7,554,927 B2 * | 6/2009 | Hanna et al. | 370/252 |
| 2002/0126654 A1 * | 9/2002 | Preston et al. | 370/352 |
| 2003/0095569 A1 * | 5/2003 | Wengrovitz et al. | 370/467 |
| 2004/0205209 A1 * | 10/2004 | Wengrovitz et al. | 709/230 |

FOREIGN PATENT DOCUMENTS

| | | | |
|---|---|---|---|
| GB | 2 381 995 A | | 5/2003 |
| GB | 2381995 | * | 5/2003 |
| GB | 2381995 A | * | 5/2003 |
| JP | 64-062934 | | 3/1989 |
| JP | 3-034743 | | 2/1991 |
| JP | 2001-358778 A | | 12/2001 |
| JP | 2003-070035 A | | 3/2003 |
| WO | WO 02/15551 A1 | | 2/2002 |

OTHER PUBLICATIONS

"B2BUA: Enabling Class 5 Capabilities in SIP Designs", www.commsdesign.com/printableArticle/:isessionid=0WFEQBYQHX-CDIQSNDBGCKHSCJUMEKJVN?articleID=16502048 18th Mar. 2005.

J. Rosenberg et al., "SIP: Session Initiation Protocol," Standards Track, 2002, The Internet Society, pp. 1, 8-34.

Interface, Jun. 2003, Present condition of TCT/IP and all about VoIP technology; pp. 79-89.

* cited by examiner

NETWORK, PRIVATE BRANCH EXCHANGE, AND MULTI PROTOCOL COMMUNICATION TERMINAL CONTROL METHOD FOR USE IN THE EXCHANGE

BACKGROUND OF THE INVENTION

1. Field of the Invention

The present invention relates to a network, a private branch exchange, and a multi protocol communication terminal control method for use in the private branch exchange, particularly to a terminal connected to the network including an Internet protocol-private branch exchange (IP-PBX).

2. Related Background Art

This type of network has heretofore been constituted by connection of a private branch exchange to a fixed phone terminal, a radio terminal such as a personal handy-phone system (PHS), a voice over Internet protocol (VoIP) terminal or the like via a local area network (LAN).

As the VoIP terminal, in addition to an IP phone terminal and an Internet phone terminal, there is a session initiation protocol terminal. The SIP is a communication protocol for use in starting or ending multimedia communication such as sound communication (fixed phone, cellular phone, etc.), video communication such as television phone, chat (conversation by characters) and the like in an environment of an IP network using data having a form referred to as an IP packet.

In the IP network, in general, connection-less type communication is performed without confirming connection to a target as in electronic mails. On the other hand, in the fixed phone, in general, connection type communication is performed while confirming the connection with the target. The SIP realizes the connection type communication in the IP network.

The SIP basically comprises methods (operations) such as INVITE (session between users is established), ACK (acknowledgment), CANCEL (INVITE is ended during the establishment of the session), and BYE (the end of the session). The respective methods are exchanged as requests and responses to the requests between clients and servers to thereby establish or end the session.

Moreover, the SIP has characteristics that applications can be comparatively easily prepared. For example, when a new service is added to H.323 of ITU-T for use in the IP phone, an H.450.x protocol which defines the H.323 additional service is added, and all H.323 end points on the network and software of a gate keeper need to be updated. However, in the SIP, an SIP application server which provides the new service is added, and the corresponding application is added. Then, the new service is usable.

However, in the communication between the SIP terminals, there is a problem that only services (e.g., transfer service, service for calling among three, call waiting service, etc.) defined by Internet engineering task force (IETF) can be provided.

That is, even when the SIP terminals are connected to the above-described network in the communication between the SIP terminals, there is a problem that various services (e.g., callback service, extension interruption service, third party control service, etc.) provided by the private branch exchange cannot be received.

Moreover, there is a problem that version of software of the SIP terminal (the above-described client) itself needs to be upgraded to thereby add the service in a case where the new service is added to the communication between the SIP terminals.

SUMMARY OF THE INVENTION

Therefore, an object of the present invention is to solve the above-described problems, and to provide a network capable of receiving various services provided with a private branch exchange without upgrading version of software of an SIP terminal itself, the private branch exchange, and a method of starting a PBX additional service for use in the exchange.

According to the present invention, there is provided a network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the network comprising:

an SIP system protocol control module incorporated as one of component groups of the private branch exchange and constituted into the module using a mechanism of a back to back user agent (B2BUA) which operates as an acting user agent of a process of the SIP; and an additional service providing module which is incorporated as one of the component groups of the private branch exchange and which provides additional services of the private branch exchange in response to a key operation of the SIP terminal.

According to the present invention, there is provided a private branch exchange which performs a call connection process between terminals and into which an SIP system protocol control module constituted into a module using a mechanism of a back to back user agent (B2BUA) operating as an acting user agent of a process of a session initiation protocol (SIP) for realizing connection type communication to perform the communication while confirming connection to a target in an Internet protocol (IP) network, and an additional service providing module for providing an additional service in response to a key operation of the SIP terminal are incorporated as one of component groups.

According to the present invention, there is provided a multi protocol communication terminal control method of a network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the method comprising the steps of:

allowing an SIP system protocol control module constituted into the module using a mechanism of a back to back user agent (B2BUA) which operates as an acting user agent and incorporated as one of component groups of the private branch exchange to perform a process of the SIP.

That is, in an Internet protocol-private branch exchange (IP-PBX) of the present invention, the session initiation protocol (SIP) process is constituted into the module using the mechanism of the back to back user agent (B2BUA), and incorporated into one of the component groups of the private branch exchange. The private branch exchange provides mutual connection, or additional service to each protocol group constituted into the module.

Therefore, in a system in which a standard SIP terminal is combined with a standard SIP proxy server, connection to various existing protocols requiring a large number of steps for realization is flexibly realized, and it is also possible to utilize various additional services of the existing private branch exchange.

Moreover, protocols constituted by expanding the SIP, such as expanded SIP protocols a and b, are constituted into modules using the mechanism of B2BUA, and incorporated into the private branch exchange in the same manner as described above. Accordingly, the additional services which are difficult to realize in a range of standard SIP protocol can be flexibly realized. Moreover, it is also possible to connect even the terminals to not only the standard SIP protocol terminal but also the existing protocol terminal.

Furthermore, in the private branch exchange of the present invention, an exchange of a dial tone multi frequency (DTMF) signal transmission/reception capability is also realized, when the private branch exchange intervenes. That is, the private branch exchange makes an appropriate response with respect to a terminal which cannot respond to inquiry of the DTMF signal transmission/reception capability, and DTMF is transmitted/received by means confirmed by negotiation with respect to opposite-end terminals. In actual DTMF signal transmission, the private branch exchange sometimes performs the private branch exchange instead.

In the private branch exchange of the present invention, by the above-described series of processes, the transmission/reception of the DTMF signal can be realized even between different protocol terminals.

In the present invention, by the following constitution and operation, an effect can be obtained that various services provided by the private branch exchange can be received without upgrading the version of the software of the SIP terminal itself.

DESCRIPTION OF THE PREFERRED
EMBODIMENTS

Figure 1:
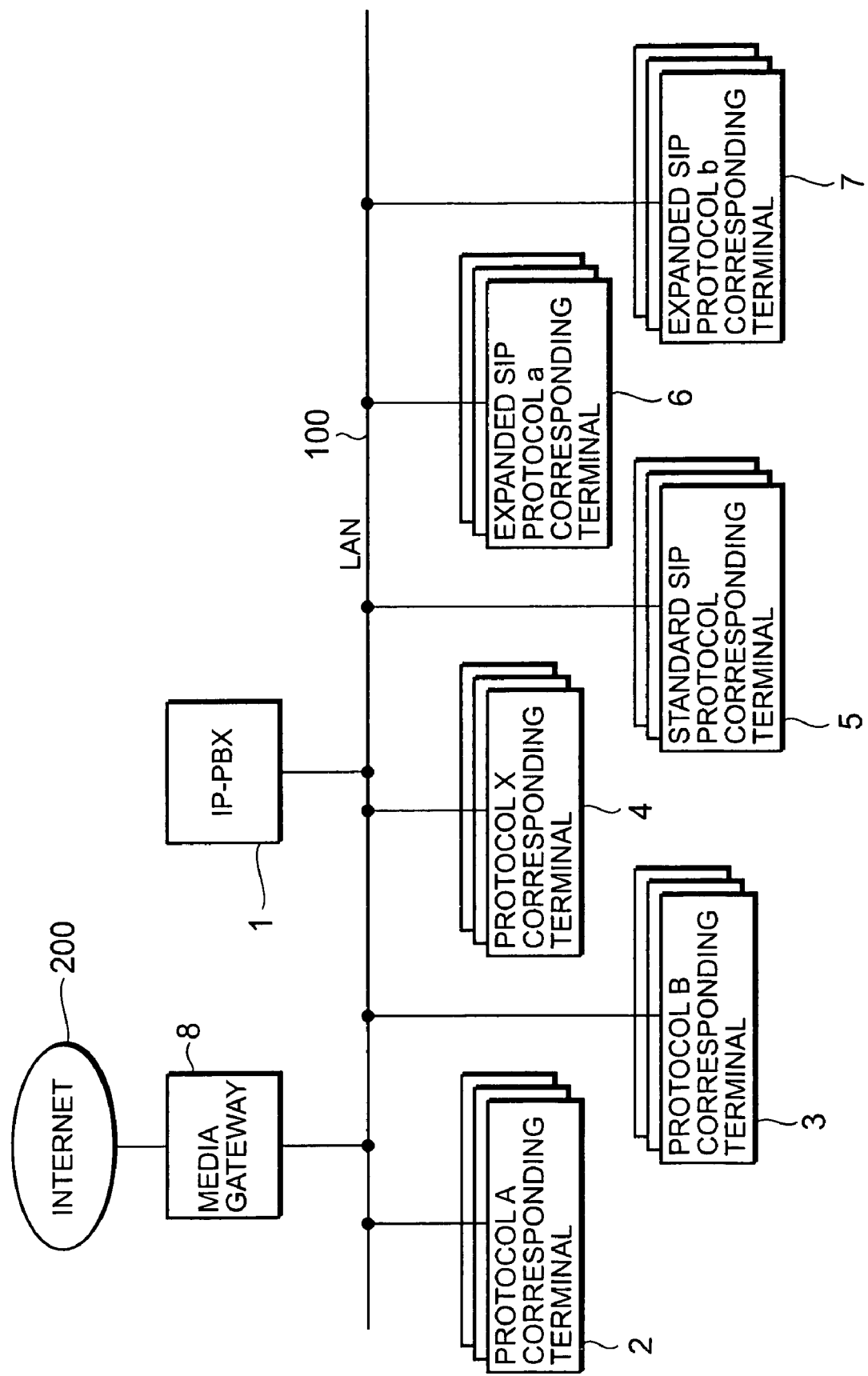
FIG. 1 is a block diagram showing a constitution of a network according to one embodiment of the present invention.

Next, embodiments of the present invention will be described with reference to the drawings. FIG. 1 is a block diagram showing a constitution of a network according to one embodiment of the present invention. In FIG. 1, in the constitution of the network according to one embodiment of the present invention, an Internet protocol-private branch exchange (IP-PBX: IP corresponding private branch exchange) 1, a protocol A corresponding terminal 2, a protocol B corresponding terminal 3, a protocol X corresponding terminal 4, a standard session initiation protocol (SIP) protocol corresponding terminal 5, an expanded SIP protocol a corresponding terminal 6, an expanded SIP protocol b corresponding terminal 7, a media gate way 8, and a radio LAN 200 are connected to one another via a local area network (LAN) 100. The constitution is connected to Internet 200 via the media gate way 8.

Figure 2:
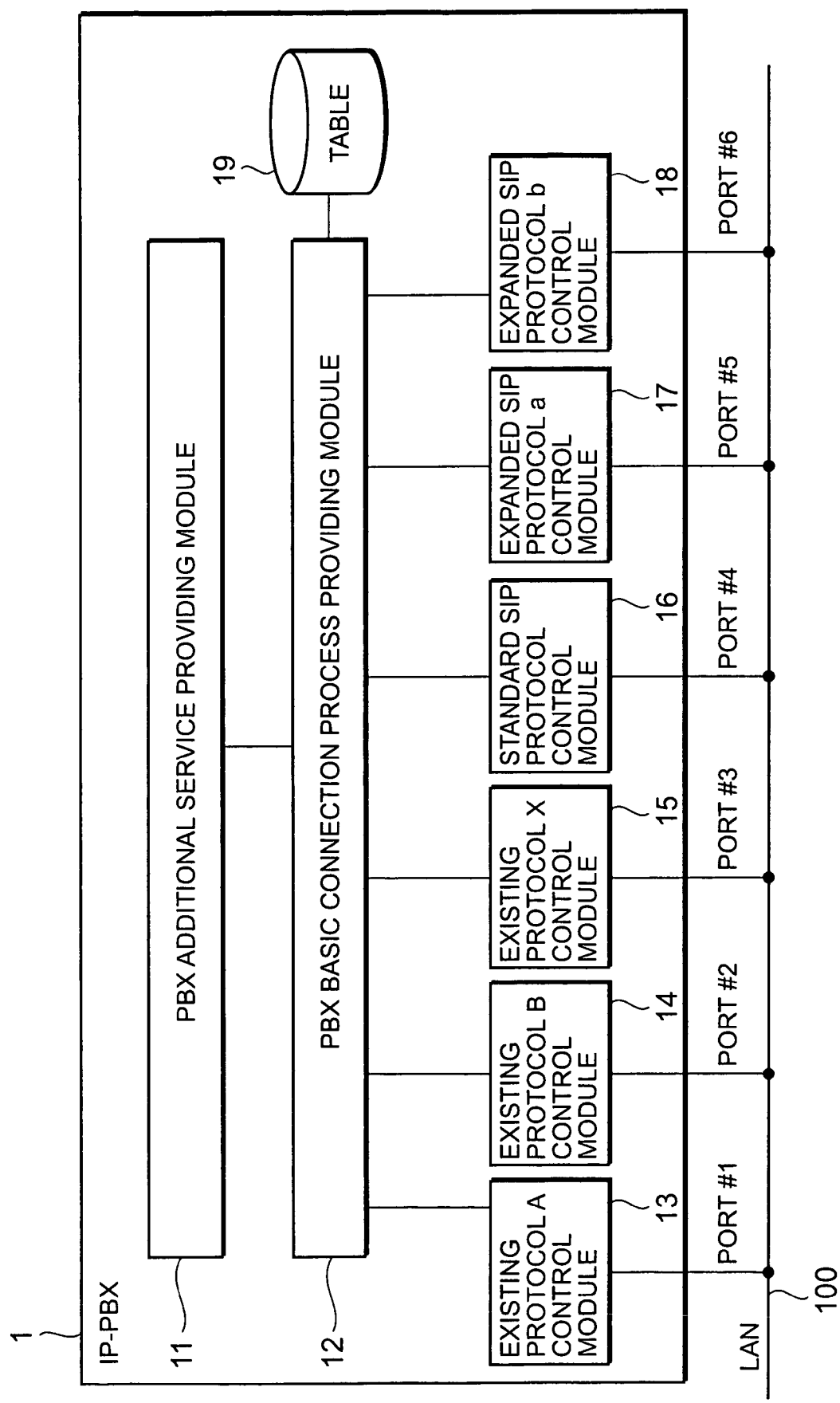
FIG. 2 is a block diagram showing a constitution of an IP-PBX of FIG. 1.

FIG. 2 is a block diagram showing a constitution of the IP-PBX 1 of FIG. 1. In FIG. 2, the IP-PBX 1 comprises: a PBX additional service providing module 11; a PBX basic connection process providing module 12; an existing protocol A control module 13; an existing protocol B control module 14; an existing protocol X control module 15; a standard SIP protocol control module 16; an expanded SIP protocol a control module 17; an expanded SIP protocol b control module 18; and a table 19.

The standard SIP protocol control module 16 and the expanded SIP protocol a control module 17 and the expanded SIP protocol b control module 18 terminate an SIP system protocol, the process of the SIP is constituted into a module using a mechanism of a back to back user agent (B2BUA), and incorporated as one of component groups of the IP-PBX 1, and the module can be realized even by hardware or software. The IP-PBX 1 provides mutual connection, and additional services with respect to each protocol group constituted into the above-described module.

Here, the B2BUA is a logical entity (function) which processes a request (message) as a user agent server, when receiving SIP request (SIP message) from an SIP terminal of a transmitter. To determine an answer to the request from the SIP terminal of the transmitter, the B2BUA operates as a user agent client with respect to the SIP terminal of the transmitter, and produces the request to the SIP terminal of a transmission target.

That is, in the B2BUA, a private user agent is combined with a public user agent, and the B2BUA operates as a user agent with respect to each network (terminal).

The PBX additional service providing module 11 provides additional services (e.g., call back service, extension interruption service, third party control service, etc.) to the protocol A corresponding terminal 2, the protocol B corresponding terminal 3, the protocol X corresponding terminal 4, the standard SIP protocol a corresponding terminal 6, and the expanded SIP protocol b corresponding terminal 7.

The PBX basic connection process providing module 12 provides a basic connection process, and mutual connection with respect to the protocol A corresponding terminal 2, the protocol B corresponding terminal 3, the protocol X corresponding terminal 4, the standard SIP protocol corresponding terminal 5, and the expanded SIP protocol a corresponding terminal 6, the expanded SIP protocol b corresponding terminal 7. The tone control module 13 performs a tone control process with respect to the protocol A corresponding terminal 2, the protocol B corresponding terminal 3, the protocol X corresponding terminal 4, the standard SIP protocol corresponding terminal 5, and the expanded SIP protocol corresponding terminal 6.

The existing protocol A control module 14 is disposed for the protocol A corresponding terminal 2, and converts a signal from the protocol A corresponding terminal 2 into a signal of a protocol (hereinafter referred to as the PBX internal protocol) inside the IP-PBX 1, and transmits the signal to the PBX basic connection process providing module 12. Moreover, the control module converts a signal from the PBX basic connection process providing module 12 into a signal of a protocol A, and transmits the signal to the protocol A corresponding terminal 2.

The existing protocol B control module 15 is disposed for the protocol B corresponding terminal 3, and converts a signal from the protocol B corresponding terminal 3 into a signal of the PBX internal protocol, and transmits the signal to the PBX basic connection process providing module 12. Moreover, the control module converts a signal from the PBX basic connection process providing module 12 into a signal of a protocol 8, and transmits the signal to the protocol B corresponding terminal 3.

The existing protocol X control module 16 is disposed for the protocol X corresponding terminal 4, and converts a signal from the protocol X corresponding terminal 4 into a signal of the PBX internal protocol, and transmits the signal to the PBX basic connection process providing module 12. Moreover, the control module converts a signal from the PBX basic connection process providing module 12 into a signal of a protocol X, and transmits the signal to the protocol X corresponding terminal 4.

The standard SIP protocol control module 17 is disposed for the standard SIP protocol corresponding terminal 5, and converts a signal from the standard SIP protocol corresponding terminal 5 into a signal of the PBX internal protocol, and transmits the signal to the PBX basic connection process providing module 12. Moreover, the control module converts a signal (response to the request, or request to the standard SIP protocol corresponding terminal 5) from the PBX basic connection process providing module 12 into a signal of a standard SIP protocol, and transmits the signal to the standard SIP protocol corresponding terminal 5.

The standard SIP protocol a control module 17 is disposed for the expanded SIP protocol a corresponding terminal 6, converts a signal (request) from the expanded SIP protocol a corresponding terminal 6 into a signal of a PBX internal protocol to transmit the signal to a PBX basic connection process providing module 12, and converts a signal (response to the above-described request, or a request to the expanded SIP protocol a corresponding terminal 6) from the PBX basic connection process providing module 12 into a signal of an expanded SIP protocol a to transmit the signal to the expanded SIP protocol a corresponding terminal 6.

The expanded SIP protocol control module 18 is disposed for the expanded SIP protocol b corresponding terminal 7, and converts a signal (request) from the expanded SIP protocol b corresponding terminal 7 into a signal of the PBX internal protocol, and transmits the signal to the PBX basic connection process providing module 12. Moreover, the control module converts a signal (a response to the request, or a request to the expanded SIP protocol b corresponding terminal 7) from the PBX basic connection process providing module 12 into a signal of an expanded SIP protocol a, and transmits the signal to the expanded SIP protocol b corresponding terminal 7.

Here, port number (ports #1 to #6) or IP address (local or global IP address) is assigned to each of the existing protocol A control module 13, existing protocol B control module 14, existing protocol X control module 15, standard SIP protocol control module 16, expanded SIP protocol a control module 17, and expanded SIP protocol b control module 18. In the table 19, the protocol of the corresponding terminal is held for each assigned port number or IP address. The PBX basic connection process providing module 12 refers to the table 19 to judge the protocol from the port number or the IP address.

Figure 3:
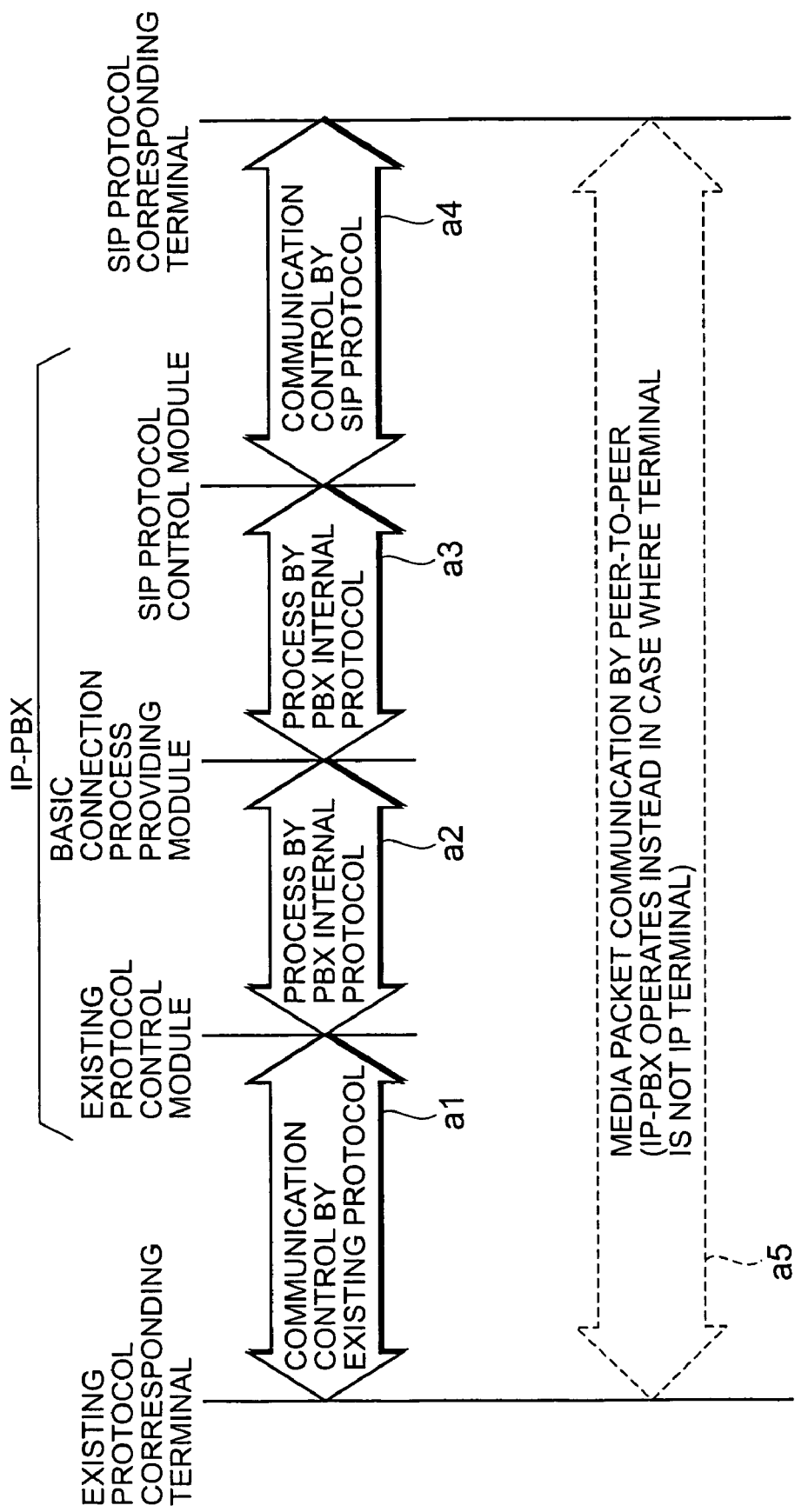
FIG. 3 is a sequence chart showing a process operation of the IP-PBX of FIG. 1.
Figure 4:
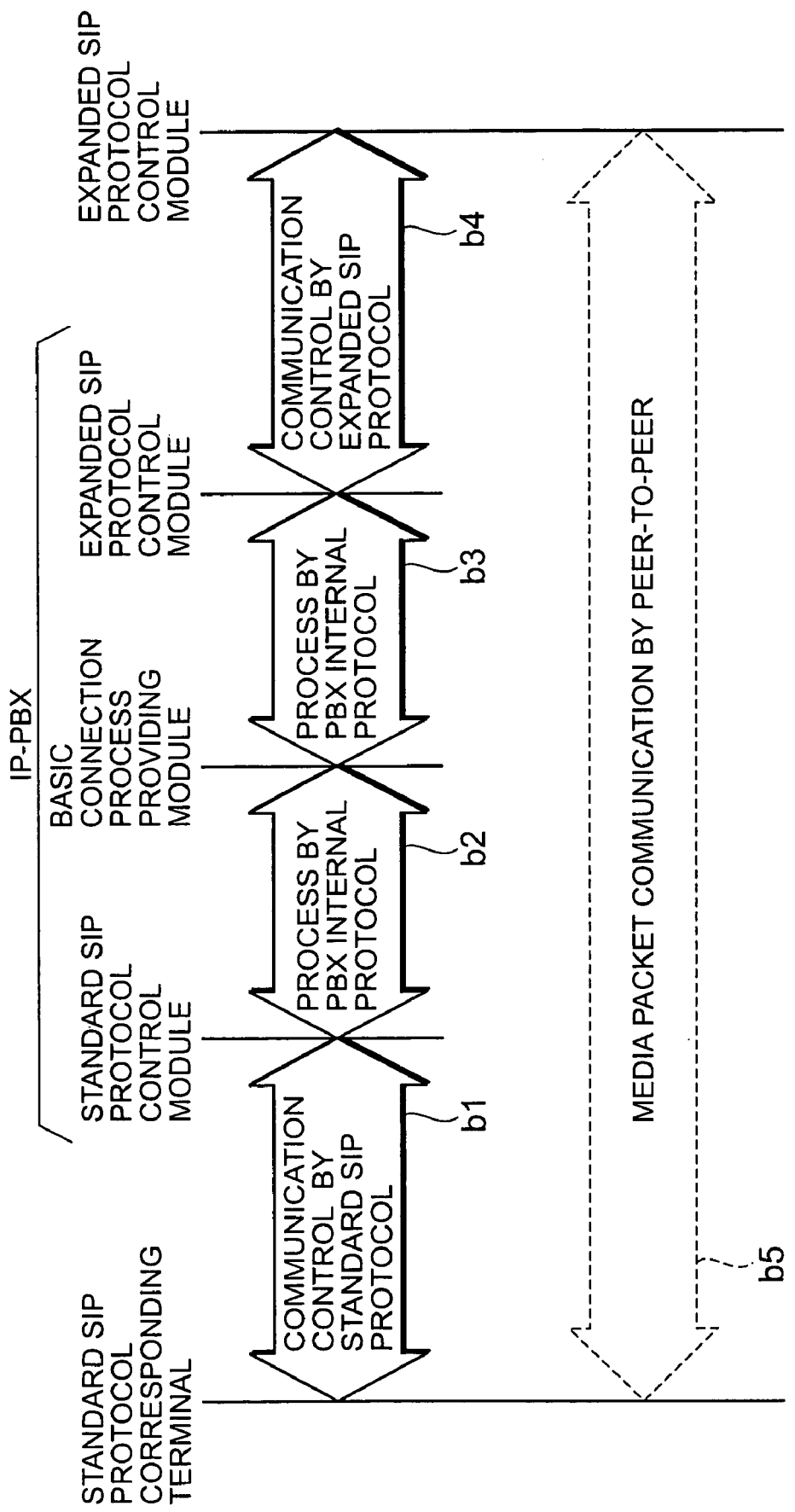
FIG. 4 is a sequence chart showing a process operation of the IP-PBX of FIG. 1.

FIGS. 3 and 4 are sequence charts showing a process operation of the IP-PBX 1 of FIG. 1. The process operation of the IP-PBX 1 will be described with reference to FIGS. 1 to 4. These processes are realized by either hardware or software (program).

First, a process will be described in a case where the existing protocol corresponding terminal (the protocol A corresponding terminal 2, the protocol B corresponding terminal 3, the protocol X corresponding terminal 4 of FIG. 1) requests connection to the SIP system protocol corresponding terminal (the standard SIP protocol corresponding terminal 5, the expanded SIP protocol a corresponding terminal 6, and the expanded SIP protocol b corresponding terminal 7 of FIG. 1).

When the existing protocol corresponding terminal transmits a request for connection to the SIP system protocol corresponding terminal with respect to the IP-PBX 1, the existing protocol control module (the existing protocol A control module 13, existing protocol B control module 14, existing protocol X control module 15 of FIG. 2) of the IP-PBX 1 accepts the connection request from the existing protocol corresponding terminal in the communication control of the existing protocol (a1 if FIG. 3), converts the connection request of the existing protocol into the signal of the PBX internal protocol, and sends the signal to the PBX basic connection process providing module 12 (process by the PBX inner protocol) (a2 of FIG. 3).

The PBX basic connection process providing module 12 processes the connection request from the existing protocol corresponding terminal to transfer the request to the SIP system protocol control module (standard SIP protocol control module 16, expanded SIP protocol a control module 17 and expanded SIP protocol b control module 18 of FIG. 2) (processing by the PBX internal protocol) (a3 of FIG. 3).

The SIP system protocol control module converts a signal from the PBX basic connection process providing module 12 into the connection request of the SIP system protocol, and transmits the connection request to the SIP protocol corresponding terminal in the communication control of the SIP system protocol (a4 of FIG. 3).

When the session between the existing protocol corresponding terminal and the SIP system protocol corresponding terminal is established by the above-described process, the media packet between the existing protocol corresponding terminal and the SIP system protocol corresponding terminal is communicated by peer-to-peer (a5 of FIG. 3). Additionally, when one of the terminals is not the IP terminal, the communication of the media packet is performed by the IP-PBX 1 instead.

It is to be noted that when the additional service of the IP-PBX 1 is utilized in the communication between the existing protocol corresponding terminal and the SIP protocol corresponding terminal, the request is transferred to the PBX additional service providing module 11 from the PBX basic connection process providing module 12 and processed.

Next, a process will be described in a case where the standard SIP protocol corresponding terminal 5 requests the connection with respect to the expanded SIP protocol corresponding terminal 6.

When the standard SIP protocol corresponding terminal 5 transmits the connection request to the expanded SIP protocol a corresponding terminal 6, the standard SIP protocol control module 16 of the IP-PBX 1 accepts the connection request from the standard SIP protocol corresponding terminal 5 in the communication control of the standard SIP protocol (b1 of FIG. 4). The module converts the connection request of the standard SIP protocol into the signal of the PBX internal protocol, and sends the signal to the PBX basic connection process providing module 12 (processing by the PBX internal protocol) (b2 of FIG. 4).

The PBX basic connection process providing module 12 processes the connection request from the standard SIP protocol corresponding terminal 5, and transfers the request to the expanded SIP protocol a control module 17 (processing by the PBX internal protocol) (b3 of FIG. 4).

The expanded SIP protocol a control module 17 converts the signal from the PBX basic connection process providing module 12 into the connection request of the expanded SIP protocol, and transmits the connection request to the expanded SIP protocol a corresponding terminal 6 in the expanded SIP protocol a (b4 of FIG. 4).

When the session between the standard SIP protocol corresponding terminal 5 and the expanded SIP protocol a corresponding terminal 6 is established by the above-described process, the media packet between the standard SIP protocol corresponding terminal 5 and the expanded SIP protocol a corresponding terminal 6 is communicated by the peer-to-peer (b5 of FIG. 4).

Figure 5:
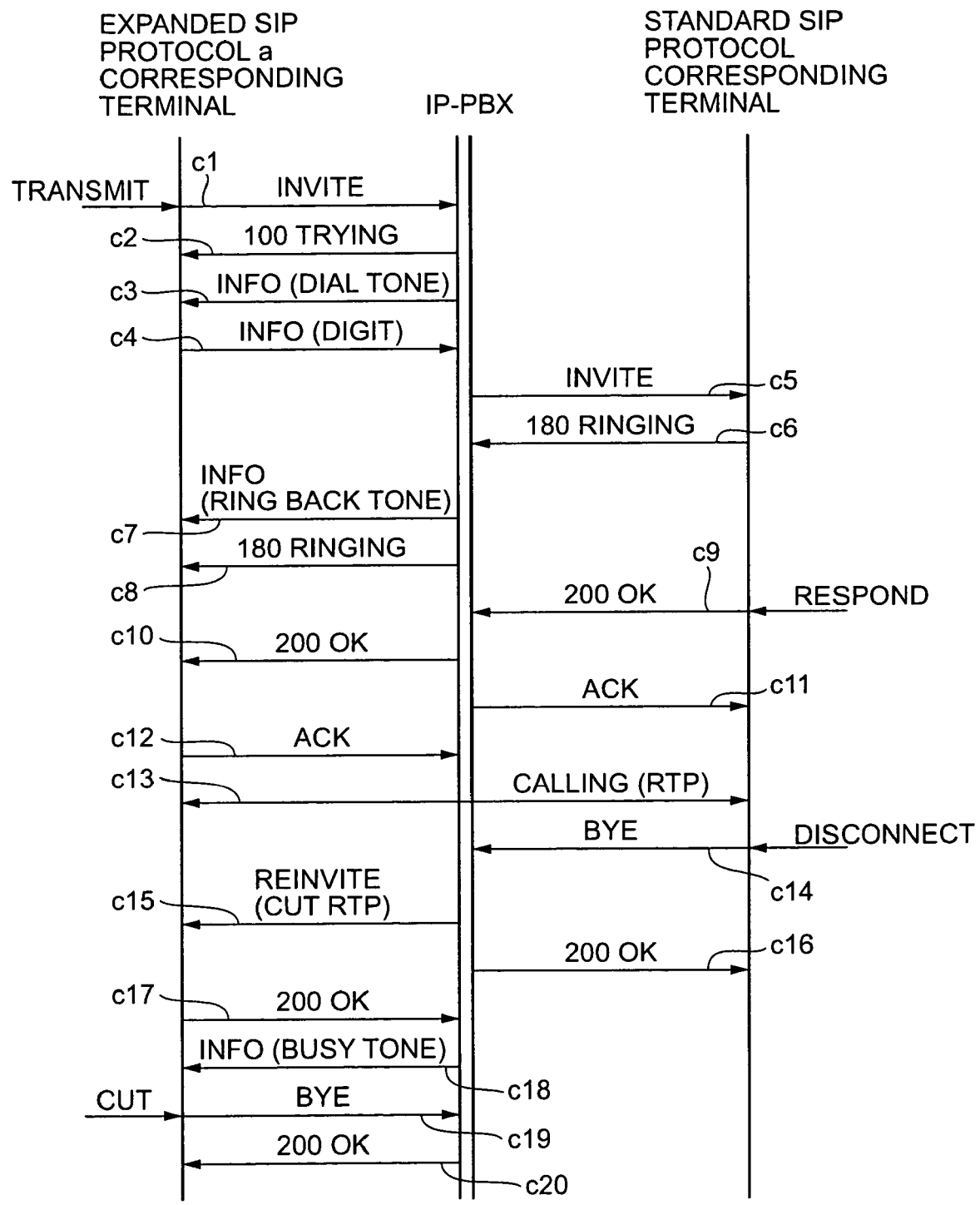
FIG. 5 is a sequence chart showing a call connection process via the IP-PBX of FIG. 1.
Figure 6:
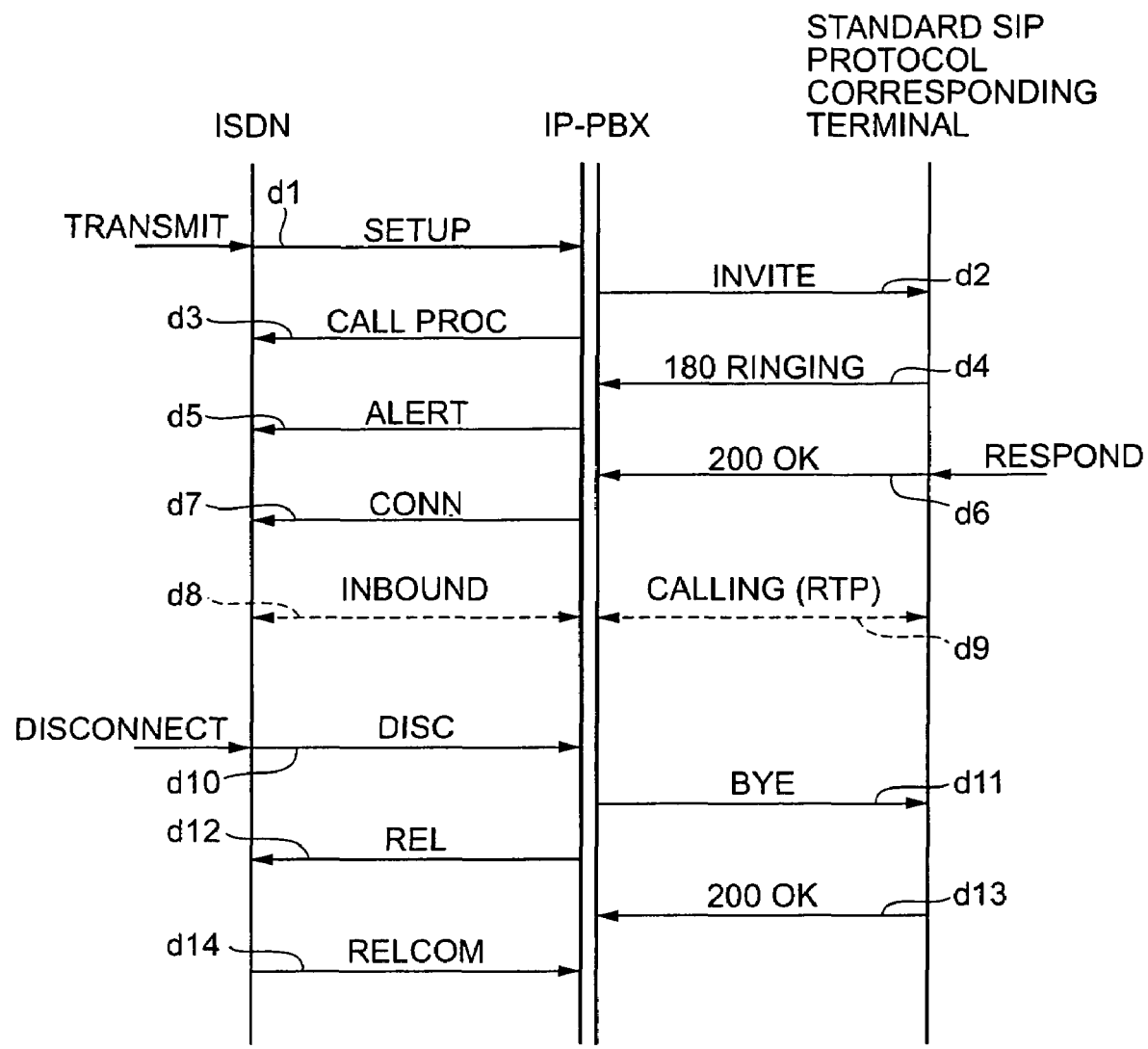
FIG. 6 is a sequence chart showing the call connection process via the IP-PBX of FIG. 1.
Figure 7:
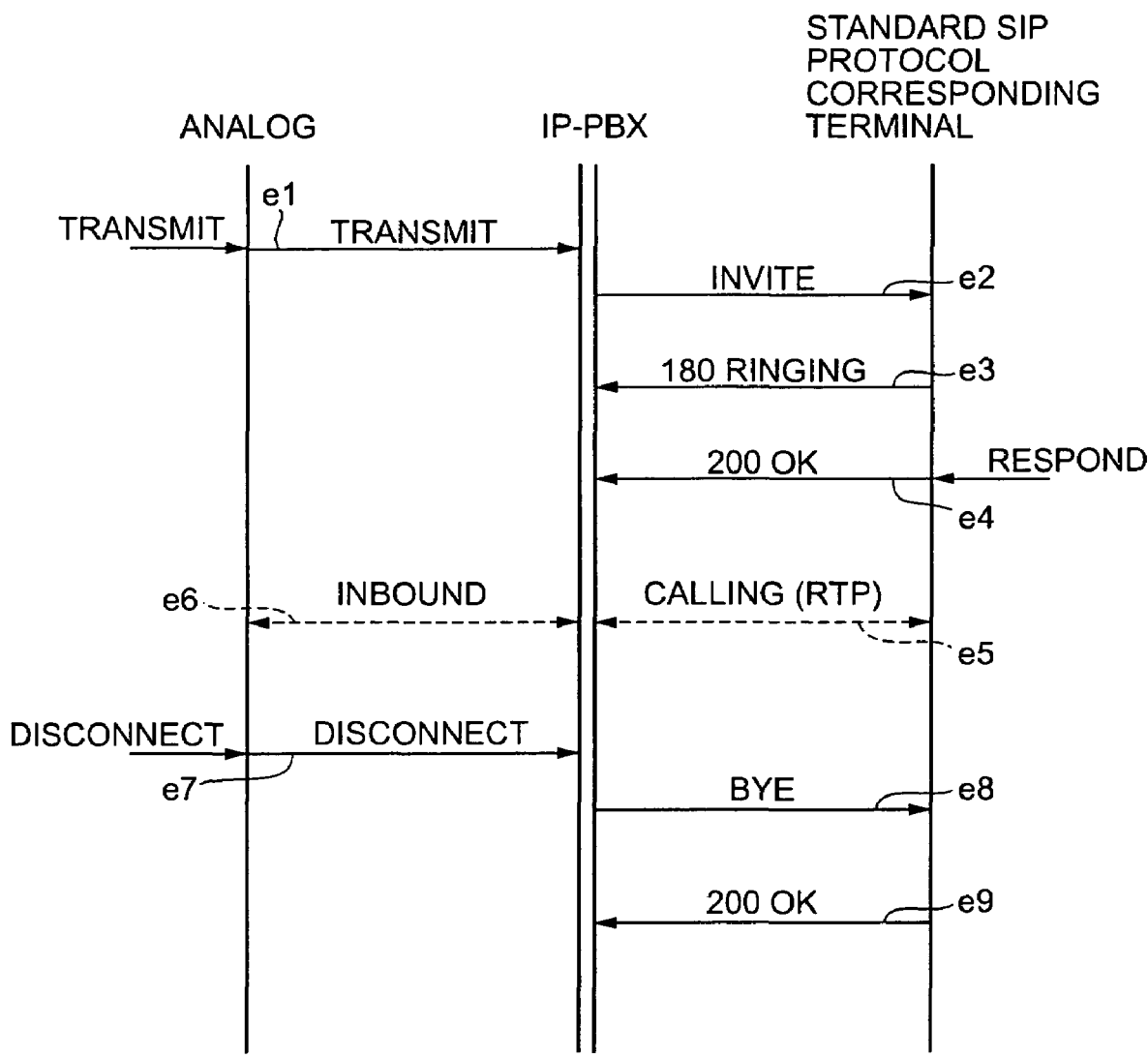
FIG. 7 is a sequence chart showing the call connection process via the IP-PBX of FIG. 1.

FIGS. 5 to 7 are sequence charts showing a call connection process via the IP-PBX 1 of FIG. 1. The call connection process via the IP-PBX 1 will be described with reference to FIGS. 1, 2, and 5 to 7.

When the expanded SIP protocol a corresponding terminal 6 performs the call connection process with respect to the standard SIP protocol corresponding terminal 5 via the IP-PBX 1, in the IP-PBX 1, the standard SIP protocol control module 16 operates as a user agent server with respect to the expanded SIP protocol a corresponding terminal 6 (c2, c3, c7, c8, c10, c15, c18, c20 of FIG. 5), and operates as a user agent client with respect to the standard SIP protocol a control module 17.

The standard SIP protocol a control module 17 operates as the user agent server with respect to the standard SIP protocol control module 16, and operates as the user agent client with respect to the standard SIP protocol corresponding terminal 5 (c5, c11, c16 of FIG. 5).

That is, when the expanded SIP protocol a corresponding terminal 6 sends "INVITE" to the IP-PBX 1 (c1 of FIG. 5), and the IP-PBX 1 returns "100 Trying", "INFO (Dial Tone)" to the expanded SIP protocol a corresponding terminal 6 (c2, c3 of FIG. 5). Thereafter, when "INFO (DIGIT)" is sent to the IP-PBX 1 from the expanded SIP protocol a corresponding terminal 6 (c4 of FIG. 5), the IP-PBX 1 sends "INVITE" to the standard SIP protocol corresponding terminal 5 (c5 of FIG. 5).

When "180 RINGING" is sent from the standard SIP protocol corresponding terminal 5 (c6 of FIG. 5), the IP-PBX 1 sends "INFO (Ring Back Tone)", "180 RINGING" to the expanded SIP protocol a corresponding terminal 6 (c7, c8 of FIG. 5). Thereafter, when "200 OK" is sent from the standard SIP protocol corresponding terminal 5 (c9 of FIG. 5), the IP-PBX 1 sends "200 OK" to the expanded SIP protocol a corresponding terminal 6 (c10 of FIG. 5).

The IP-PBX 1 sends "ACK" to the standard SIP protocol corresponding terminal 5 (c11 of FIG. 5), and receives "ACK" from the expanded SIP protocol a corresponding terminal 6 (c12 of FIG. 5). Accordingly, "calling (real time transport protocol: RTP)" state is brought between the expanded SIP protocol a corresponding terminal 6 and the standard SIP protocol corresponding terminal 5 (c13 of FIG. 5).

When "BYE" is sent from the standard SIP protocol corresponding terminal 5 (c14 of FIG. 5), the IP-PBX 1 sends "reINVITE (cut RTP)" to the expanded SIP protocol a corresponding terminal 6 (c15 of FIG. 5), and returns "200 OK" to the standard SIP protocol corresponding terminal 5 (c16 of FIG. 5).

When "200 OK" returns from the expanded SIP protocol a corresponding terminal 6 (c17 of FIG. 5), the IP-PBX 1 sends "INFO (Busy Tone)" to the expanded SIP protocol a corresponding terminal 6 (c18 of FIG. 5). When the expanded SIP protocol a corresponding terminal 6 sends "BYE" by disconnection of the call (c19 of FIG. 5), the IP-PBX returns "200 OK" to the expanded SIP protocol a corresponding terminal 6 (c20 of FIG. 5).

Here, "INVITE" indicates a method for use in establishing a session between participants, "100 Trying" indicates that a trial is being performed, "INFO" is a method for use in notifying the information, "180 RINGING" indicates the ringing, "200 OK" indicates that the response is successful, "ACK" indicates a method for use in permitting the establishment of the session, and "BYE" indicates a method for ending the session.

On the other hand, when an integrated services digital network (ISDN) terminal (not shown) performs the call connection process with respect to the standard SIP protocol corresponding terminal 5 via the IP-PBX 1, the ISDN terminal transmits "SETUP" to the IP-PBX 1 (d1 of FIG. 6), and then the IP-PBX sends "INVITE" to the standard SIP protocol corresponding terminal 5 (d2 of FIG. 6), and sends "CALL PROC" to the ISDN terminal (d3 of FIG. 6).

When the standard SIP protocol corresponding terminal 5 sends "180 RINGING" to the IP-PBX 1 (d4 of FIG. 6), the IP-PBX sends "ALERT" to the ISDN terminal (d5 of FIG. 6). When the standard SIP protocol corresponding terminal 5 makes a response to send "200 OK" (d6 of FIG. 6), the IP-PBX sends "CONN" to the ISDN terminal (d7 of FIG. 6). Accordingly, "impound", "calling (RTP)" state is brought between the ISDN terminal and the standard SIP protocol corresponding terminal 5 (d8, d9 of FIG. 6).

When the ISDN terminal sends "DISC" to the IP-PBX 1 (d10 of FIG. 6), the IP-PBX sends "BYE" to the standard SIP protocol corresponding terminal 5 (d11 of FIG. 6), and sends "REL" to the ISDN terminal (d12 of FIG. 6). Thereafter, when the standard SIP protocol corresponding terminal 5 sends "200 OK", and the ISDN terminal sends "RELCOM" to the IP-PBX 1 (d13, d14 of FIG. 6), the IP-PBX ends the process.

Moreover, in a case where an analog terminal (not shown) performs the call connection process with respect to the standard SIP protocol corresponding terminal 5 via the IP-PBX 1, when the analog terminal sends "transmission" to the IP-PBX 1 (e1 of FIG. 7), the IP-PBX sends "INVITE" to the standard SIP protocol corresponding terminal 5 (e2 of FIG. 7).

Accordingly, when the standard SIP protocol corresponding terminal 5 sends "180 RINGING", "200 OK" to the IP-PBX 1 (e3, e4 of FIG. 7), the "impound", "calling (real time transport protocol: RTP)" state is brought between the analog terminal and the standard SIP protocol corresponding terminal 5 (e5, e6 of FIG. 7).

When the analog terminal sends "disconnection" to the IP-PBX 1 (e7 of FIG. 7), the IP-PBX sends "BYE" to the standard SIP protocol corresponding terminal 5 (e8 of FIG. 7). Thereafter, when the standard SIP protocol corresponding terminal 5 sends "200 OK" to the IP-PBX 1 (e9 of FIG. 7), the IP-PBX ends the process.

Accordingly, in the present embodiment, in a system of a combination of the standard SIP terminal with a standard SIP proxy server, connection to various existing protocols which have required many steps for realizing the system can be flexibly realized. Moreover, great variety of additional services of the existing IP-PBX 1 are usable.

Furthermore, in the present embodiment, protocols such as expanded SIP protocols a and b obtained by expanding the SIP protocol are constituted into the module using the mechanism of B2BUA, and incorporated in the IP-PBX 1 in the same manner as described above. Accordingly, the additional services and the like which are difficult to realize in a range of the standard SIP protocol can be flexibly realized, and further mutual connection to not only the standard SIP protocol corresponding terminal 5 but also the existing protocol terminal can be provided with respect to the terminals.

Figure 8:
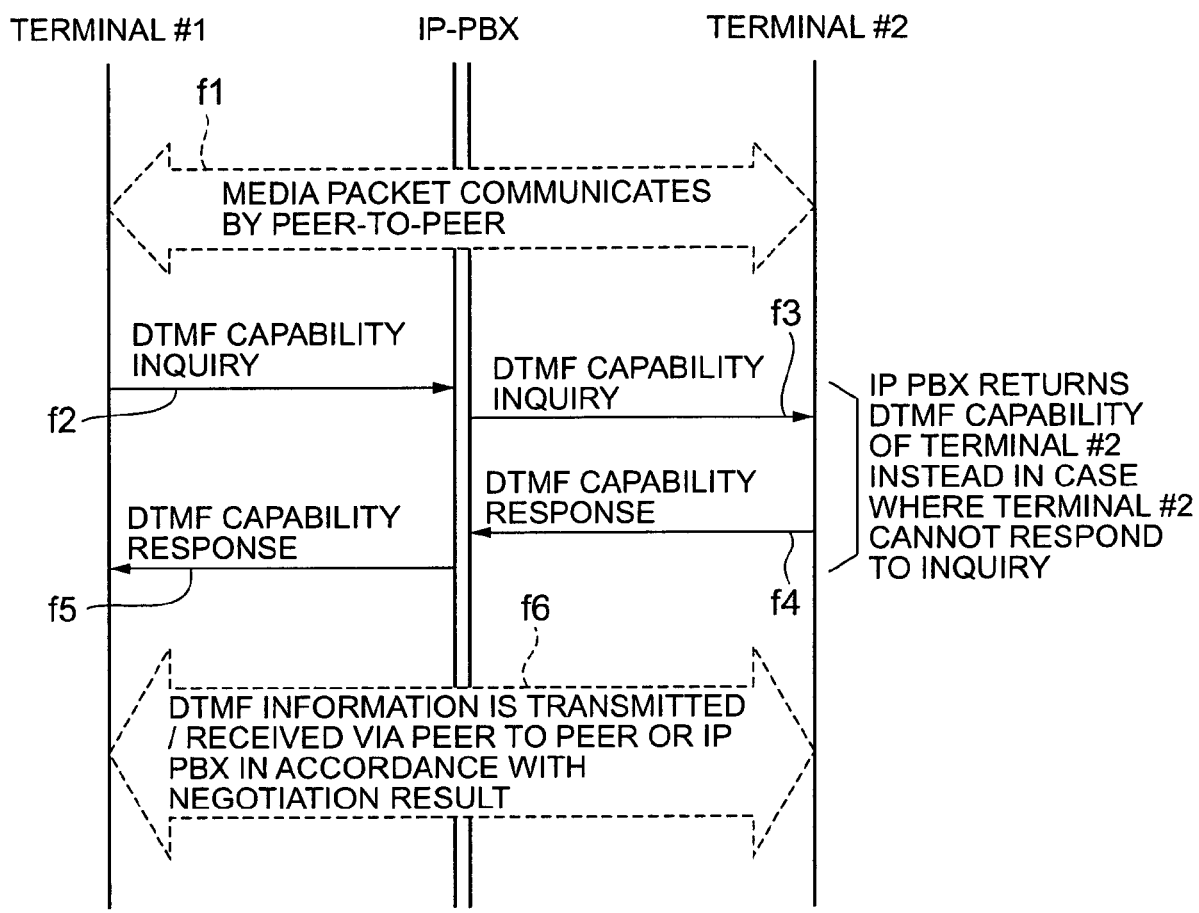
FIG. 8 is a sequence chart showing an exchange process of a DTMF signal transmission/reception capability, in which the IP-PBX of FIG. 1 intervenes.

FIG. 8 is a sequence chart showing an exchange process of a dial tone multi frequency (DTMF) signal transmission/reception capability, in which the IP-PBX 1 of FIG. 1 intervenes. The exchange process of the DTMF signal transmission/reception capability, in which the IP-PBX 1 intervenes, will be described with reference to FIG. 8.

In the present embodiment, the exchange process of the DTMF signal transmission/reception capability is also realized, when the IP-PBX 1 intervenes. The IP-PBX 1 makes an appropriate response with respect to the terminal which cannot respond to capability inquiry. The DTMF is transmitted/received with respect to opposite-end terminals by means confirmed by negotiation. In actual DTMF signal transmission, the IP-PBX sometimes performs the transmission instead.

That is, when a terminal #1 sends a DTMF capability inquiry (f2 of FIG. 8) during communication of a media packet by peer-to-peer between terminals #1 and #2 (f1 of FIG. 8), the IP-PBX 1 sends the DTMF capability inquiry to the terminal #2 (f3 of FIG. 8).

When a DTMF capability response returns to the IP-PBX 1 from the terminal #2, the IP-PBX returns the DTMF capability response to the terminal #1 (f5 of FIG. 8). Thereafter, DTMF information is transmitted/received via the peer-to-peer or IP-PBX 1 in accordance with a negotiation result (f6 of FIG. 8).

On the other hand, when the terminal #2 cannot respond to the inquiry, the IP-PBX 1 makes a response of the DTMF capability of the terminal #2 instead. That is, when the terminal #1 sends the DTMF capability inquiry to the IP-PBX 1 (f2 of FIG. 8), the IP-PBX returns the DTMF capability response to the terminal #1 without sending the DTMF capability inquiry to the terminal #2 (f5 of FIG. 8). Thereafter, the DTMF information is transmitted/received via the peer-to-peer or IP-PBX 1 in accordance with the negotiation result (f6 of FIG. 8).

By these series of processes, the transmission/reception of the DTMF signal can be realized even between different protocol terminals in the present embodiment.

Thus, in the present embodiment, the client terminal conforming to the SIP can be incorporated into the service of the IP-PBX 1, free mutual connection to the terminal corresponding to various protocols supported by the existing IP-PBX 1 is provided with respect to the SIP client terminal, and great variety of additional services of the existing IP-PBX 1 can be provided.

Figure 9:
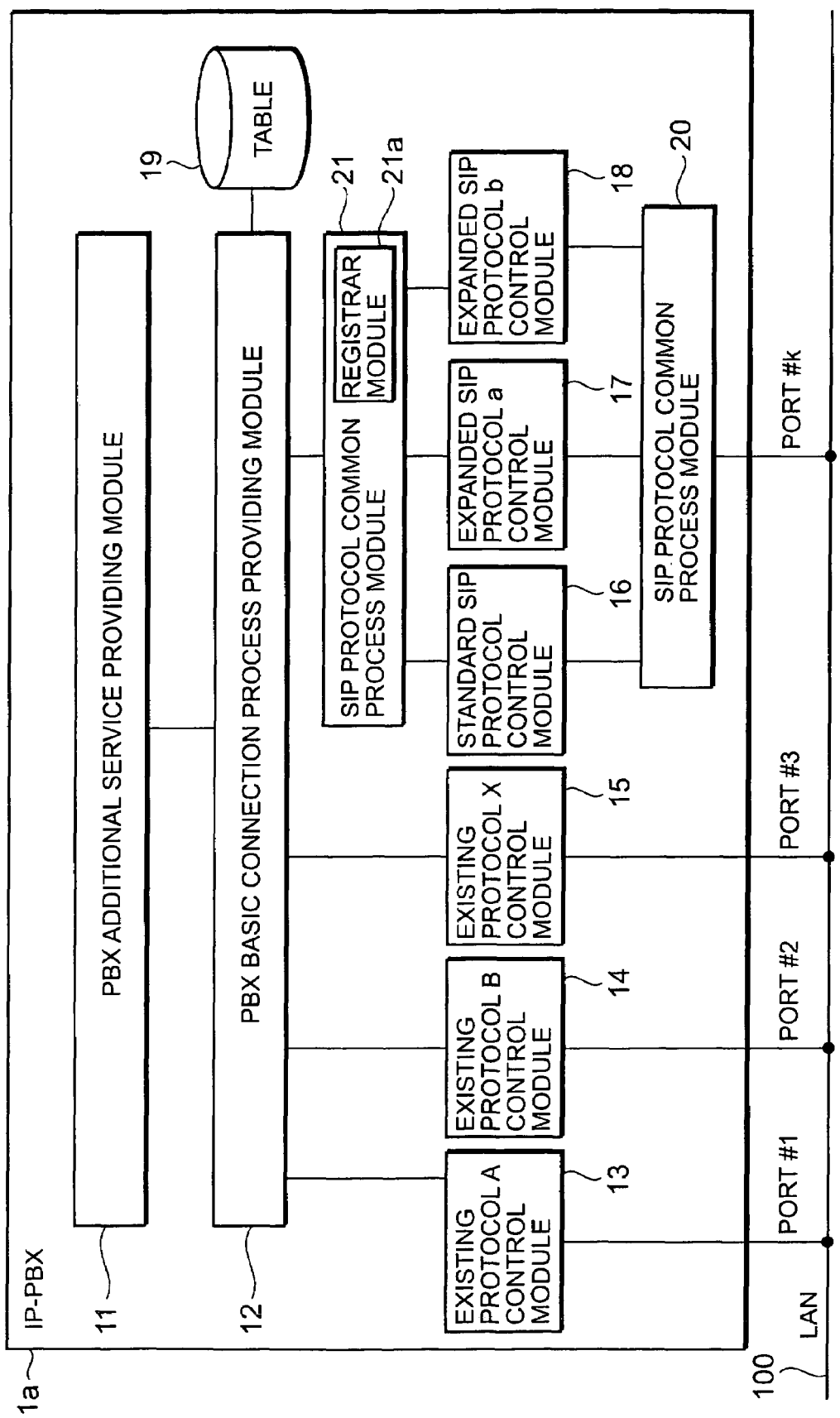
FIG. 9 is a block diagram showing a constitution of the IP-PBX according to another embodiment of the present invention.

FIG. 9 is a block diagram showing a constitution of the IP-PBX according to another embodiment of the present invention. In FIG. 9, an IP-PBX 1a according to the other embodiment of the present invention has a constitution similar to that of Fe IP-PBX 1 according to one embodiment of the present invention shown in FIG. 2 except that a common process in the standard SIP protocol control module 16, the expanded SIP protocol a control module 17, and the expanded SIP protocol b control module 18 is constituted into modules, that is, SIP system protocol common process modules 20, 21 are disposed. The same constituting elements are denoted with the same reference numerals.

Additionally, the standard SIP protocol control module 16, the expanded SIP protocol a control module 17, and the expanded SIP protocol b control module 18 are constituted into modules while saving the common process. For example, an SIP system protocol register module 21a for registering contact information is disposed as this common process.

It is to be noted that in the present embodiment, the SIP system protocol common process modules 20, 21 are disposed on a LAN 100 side and a PBX basic connection process providing module 12 side, respectively, with respect to the standard SIP protocol control module 16, the expanded SIP protocol a control module 17, and the expanded SIP protocol b control module 18, and they can be realized by one module.

Moreover, in the above-described one embodiment of the present invention, ports #4 to #6 are assigned to the expanded SIP protocol a control module 17 and the expanded SIP protocol b control module 18, respectively, but in the present embodiment, a common port #k is assigned to the SIP system protocol common process module 20.

By these series of processes, the DTMF signal can be transmitted/received even between different protocol terminals in the present embodiment. Moreover, in the present embodiment, the client terminal conforming to the SIP can be incorporated into the service of the IP-PBX 1, free mutual connection to the terminal corresponding to various protocols supported by the existing IP-PBX 1 is provided with respect to the SIP client terminal, and great variety of additional services of the existing IP-PBX 1 can be provided.

As described above, the present invention is applicable to not only the providing of the service of the private branch exchange with respect to the SIP terminal in a network such as LAN but also a call connection process via an external IP network such as Internet. The present invention is also applicable to IP centrex which provides PBX function via IP network.

What is claimed is:

1. A network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the network comprising:

an SIP system protocol control module incorporated as one of component groups of the private branch exchange and constituted into the module using a mechanism of a back to back user agent (B2BUA) which operates as an acting user agent of a process of the SIP;

an additional service providing module which is incorporated as one of the component groups of the private branch exchange and which provides additional services of the private branch exchange in response to a key operation of the SIP terminal;

a PBX basic connection process providing module;

a first SIP protocol common process module that is communicatively connected between the PBX basic connection process providing module and the additional service providing module, the first SIP protocol common process module also being communicatively connected between the PBX basic connection process providing module and the SIP system protocol control module;

a second SIP protocol common process module that is communicatively connected between the IP network and the additional service providing module, the second SIP protocol common process module also being communicatively connected between the IP network and the SIP system protocol control module; and a table connected to the PBX basic connection processing providing module, wherein the PBX basic connection process providing module is communicatively provided between the additional services providing module and the SIP system protocol control module, and wherein the additional services include each of call back service, extension interruption service, and third party control service.

2. The network according to claim 1, wherein the SIP is a communication protocol for use in starting or ending a multimedia communication using data in the form of an IP packet.

3. The network according to claim 2, wherein the SIP system protocol control module is disposed for a plurality of SIP terminals having different protocols.

4. The network according to claim 1, wherein the private branch exchange provides at least mutual connection and additional service to each protocol group constituted into the module.

5. The network according to claim 1, wherein exchanging of a dial tone multi frequency (DTMF) signal transmission/reception capability between terminals is realized via the private branch exchange.

6. The network according to claim 5, wherein the private branch exchange transmits the DTMF signal instead of a terminal incapable of exchanging the DTMF signal transmission/reception capability.

7. A private branch exchange which performs a call connection process between terminals, wherein an SIP system protocol control module obtained by constituting a process of a session initiation protocol (SIP) for realizing a connection type communication to perform the communication while confirming connection to a target in an Internet protocol (IP) network into the module using a mechanism of a back to back user agent (B2BUA) which operates as an acting user agent is incorporated as one of component groups, the private branch exchange further comprising:

a PBX basic connection process providing module;

a first SIP protocol common process module that is communicatively connected between the PBX basic connection process providing module and the additional service providing module, the first SIP protocol common process module also being communicatively connected between the PBX basic connection process providing module and the SIP system protocol control module;

a second SIP protocol common process module that is communicatively connected between the IP network and the additional service providing module, the second SIP protocol common process module also being communicatively connected between the IP network and the SIP system protocol control module; and a table connected to the PBX basic connection processing providing module, wherein the PBX basic connection process providing module is communicatively provided between the additional services providing module and the SIP system protocol control module, wherein at least one of mutual connection and additional service is provided to each protocol group constituted into the module, and wherein the additional service include each of call back service, extension interruption service, and third party control service.

8. The private branch exchange according to claim 7, wherein the SIP is a communication protocol for use in starting or ending a multimedia communication using data in the form of an IP packet.

9. The private branch exchange according to claim 7, wherein the SIP system protocol control module is disposed for a plurality of SIP terminals having different protocols.

10. The private branch exchange according to claim 7, which provides at least one of mutual connection and additional service to each protocol group constituted into the module.

11. The private branch exchange according to claim 7, which realizes exchanging of a dial tone multi frequency (DTMF) signal transmission/reception capability between terminals.

12. The private branch exchange according to claim 11, which transmits the DTMF signal instead of a terminal incapable of exchanging the DTMF signal transmission/reception capability.

13. A multi protocol communication terminal control method of a network including: at least a session initiation protocol (SIP) terminal which performs communication by an SIP for realizing connection type communication to perform the communication while confirming connection to a target in an Internet protocol (IP) network; and a private branch exchange which performs a call connection process between the terminals, the method comprising the steps of:

allowing an SIP system protocol control module constituted into the module using a mechanism of a back to back user agent (B2BUA) which operates as an acting user agent and incorporated as one of component groups of the private branch exchange to perform a process of the SIP; and determining, based on accesses to a table that is connected to a PBX basic connection process providing module, a protocol of a corresponding terminal held for each assigned port number or IP address, in which the protocol is determined from the table based on the assigned port number or the IP address;

communicatively connecting a first SIP protocol common process module between the PBX basic connection process providing module and the additional service providing module, the first SIP protocol common process module also being communicatively connected between the PBX basic connection process providing module and the SIP system protocol control module; and communicatively connecting a second SIP protocol common process module between the IP network and the additional service providing module, the second SIP protocol common process module also being communicatively connected between the IP network and the SIP system protocol control module, wherein at least one of mutual connection and additional service is provided to each protocol group constituted into the module, and wherein the additional service include each of call back service, extension interruption service, and third party control service.

14. The network according to claim 5, wherein the SIP system protocol module converts a signal from a private branch exchange (PBX) basic connection process providing module into a connection request of a SIP system protocol, and transmits the connection request to the SIP terminal in a communication control of the SIP system protocol.

15. The private branch exchange according to claim 7, wherein the SIP system protocol module converts a signal from a private branch exchange (PBX) basic connection process providing module into a connection request of a SIP system protocol, and transmits the connection request to the SIP terminal in a communication control of the SIP system protocol.

16. The multi protocol communication terminal control method according to claim 13, wherein the SIP system protocol module converts a signal from a private branch exchange (PBX) basic connection process providing module into a connection request of a SIP system protocol, and transmits the connection request to the SIP terminal in a communication control of the SIP system protocol.

17. The network according to claim 1, wherein the PBX basic connection process providing module accesses the table to determine a protocol of a corresponding terminal held for each assigned port number or IP address, so as to judge the protocol from the assigned port number or the IP address.

18. The method according to claim 13, wherein the PBX basic connection process providing module accesses the table to determine a protocol of a corresponding terminal held for each assigned port number or IP address, in which the protocol is determined from the table based on the assigned port number or the IP address.

19. The network according to claim 1, wherein the first SIP protocol common process module includes a registrar module for registering contact information, and wherein the second SIP protocol common process module does not include a registrar module.

20. The private branch exchange according to claim 7, wherein the first SIP protocol common process module includes a registrar module for registering contact information, and wherein the second SIP protocol common process module does not include a registrar module.

21. The method according to claim 13, wherein the first SIP protocol common process module includes a registrar module for registering contact information, and wherein the second SIP protocol common process module does not include a registrar module.

* * * * *

UNITED STATES PATENT AND TRADEMARK OFFICE
CERTIFICATE OF CORRECTION

PATENT NO. : 7,660,293 B2  Page 1 of 1
APPLICATION NO. : 10/968185
DATED : February 9, 2010
INVENTOR(S) : Yoshio Itagaki and Shinobu Kimata It is certified that error appears in the above-identified patent and that said Letters Patent is hereby corrected as shown below:

Title Page, Item (73) Assignee should read:

NEC Infrontia Corporation, Kanagawa (JP)

Signed and Sealed this

Seventh Day of September, 2010

David J. Kappos
*Director of the United States Patent and Trademark Office*